(12) United States Patent
Million (10) Patent No.: US 8,764,466 B2
(45) Date of Patent: Jul. 1, 2014

(54) ELECTRICAL DEVICE (75) Inventor: Philip Stephen Million, Durham (GB)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 13/494,347

(22) Filed: Jun. 12, 2012

(65) Prior Publication Data
US 2013/0017706 A1  Jan. 17, 2013

(30) Foreign Application Priority Data

Jul. 14, 2011  (EP) .................................... 11174005

(51) Int. Cl.
*H01R 29/00* (2006.01)
(52) U.S. Cl.
USPC .............................. 439/172; 439/518; 30/276
(58) Field of Classification Search
USPC ................. 439/170–173, 518, 350, 501, 447; 30/276
See application file for complete search history.

(56) References Cited

U.S. PATENT DOCUMENTS

| 3,959,879 | A | | 6/1976 | Sellers | |
|---|---|---|---|---|---|
| 5,615,970 | A | * | 4/1997 | Reekie et al. | 403/379.1 |
| 5,634,322 | A | * | 6/1997 | Woods et al. | 53/473 |
| 6,923,666 | B1 | * | 8/2005 | Liao | 439/172 |
| 7,597,570 | B2 | * | 10/2009 | So | 439/172 |
| 2006/0005673 | A1 | | 1/2006 | Long et al. | |

FOREIGN PATENT DOCUMENTS

EP  1714662  10/2006

* cited by examiner

*Primary Examiner* — Hien Vu
(74) *Attorney, Agent, or Firm* — John Yun (57) ABSTRACT

An electrical device comprising a housing for electrical circuitry, the housing defining a cavity opening to the exterior of the device. The cavity includes a first and second fixing arrangement capable of mechanically interlocking with a power connection insert to fix the power connection insert in position. The power connection insert provides a power cable or power connector that couples the electrical circuitry to an external electrical power supply for the device. The use of different power connection inserts allows a wide range of connector types to be provided using a single design of the housing.

11 Claims, 8 Drawing Sheets

ELECTRICAL DEVICE

The present invention relates to an electrical device. Preferred embodiments relate to power tools and gardening equipment such as lawn mowers, trimmers, hedge trimmers, string trimmers and the like.

BACKGROUND OF THE INVENTION

Figure 1:
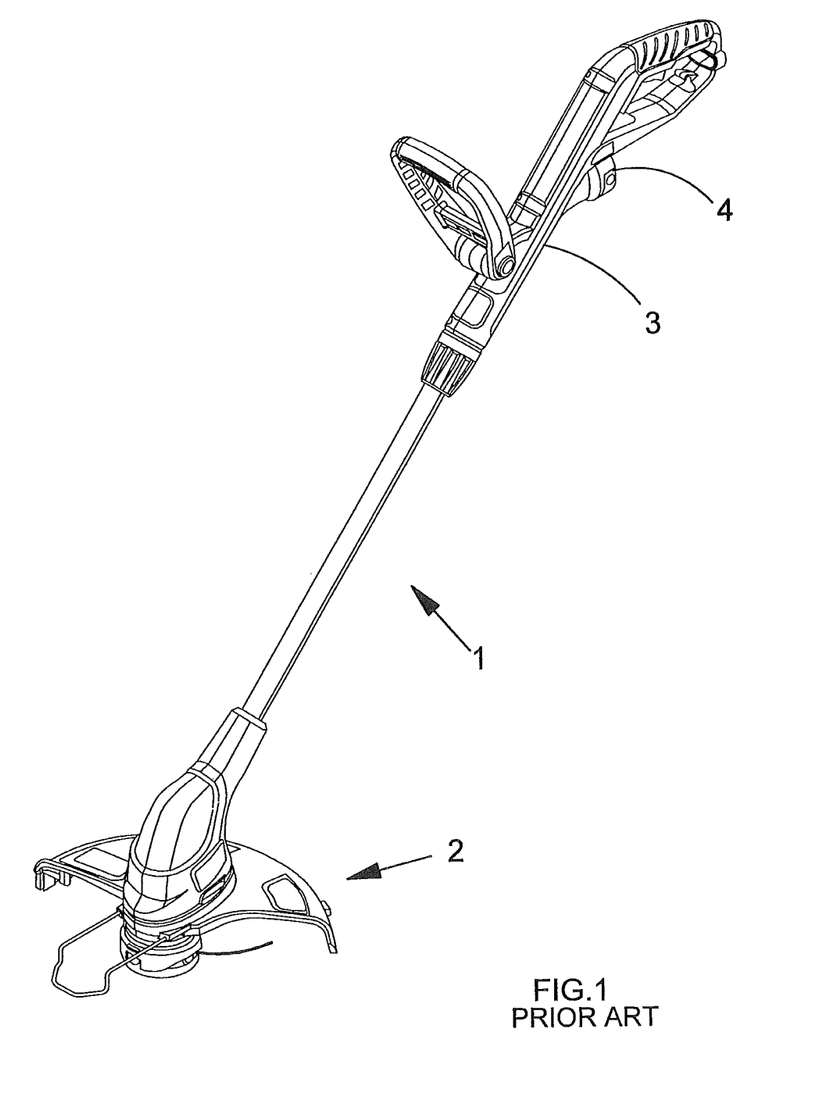
FIG. 1 shows an electrical device as known in the prior art.

FIG. 1 shows an example of an electrical device 1, which in this example is an electrically powered string trimmer 1 as known in the prior art. The string trimmer 1 has a cutting end 2 which has a rotating string or strings for cutting grass, etc. At the other end, the string trimmer 1 has a handle 3 by which the operator can manipulate the device. The handle 3 has a power connection 4 by which electrical power can be supplied to the string trimmer 1.

Figure 2:
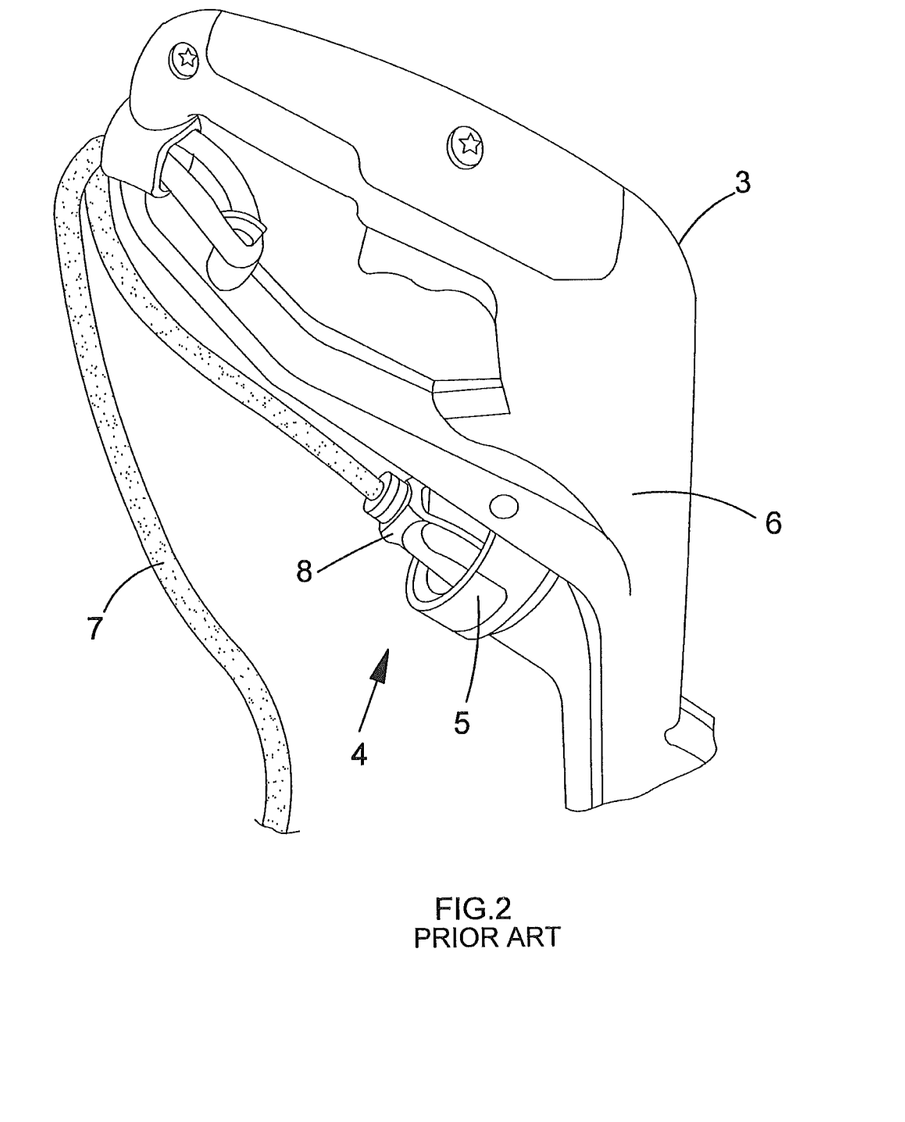
FIG. 2 shows a detailed view of the handle area of the device of FIG. 1.

FIG. 2 shows a detailed view of the handle 3 of the string trimmer 1. In this example, the power connection 4 takes the form of a socket 5 formed in the housing 6 of the handle 3. A power cable 7 has a corresponding plug 8 for plugging into the socket 5. The operator of the trimmer 1 connects the other end of the power cable 7 to a suitable mains electricity outlet to provide power to the trimmer 1.

Figures 3, 4, 5:
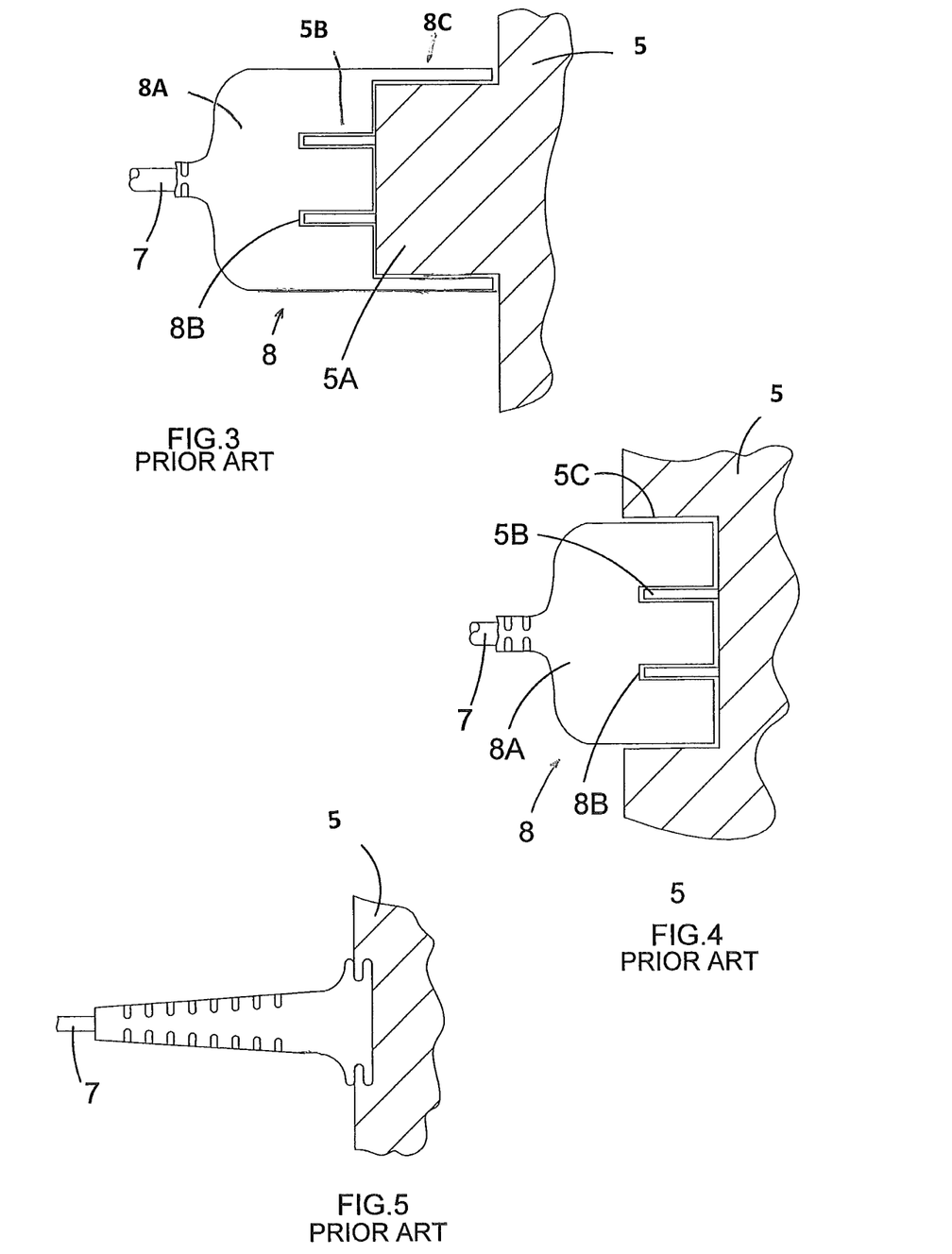
FIGS. 3 to 5 show examples of electrical power connections between a power cable and a device.

Different countries have different standards and safety regulations governing the arrangement of plugs/sockets and the provision of electrical power to electrical devices. Furthermore, many countries have specific regulations governing the provisioning of power to power tools and other equipment where there is a risk of accidentally severing the electrical power cable 7. FIGS. 3 to 5 show three examples of different ways in which a power connection can be made to an electrical device 1 which are used in various countries.

In FIG. 3, a socket 5 in the form of a male connector comprising a protruding body portion 5A and conducting pins 5B which extend from the body portion 5A. The power cable 7 has a plug 8 in the form of a female connector for mating with the male connector of the socket 5. The plug 8 comprises a body portion 8A having holes 8B for receiving the pins 5B of the socket 5. The plug also has a shell portion 8C which extends beyond the body 8A and forms a receptacle in which the body portion 5A is received when the two are mated. This helps make a mechanical connection between the two parts. This also shields the pins 5B when the plug 8 and socket 5 are engaged. Such an arrangement is common for example in various European countries.

In FIG. 4, the socket 5 of the device is a male connector comprising a receptacle 5C within which the male pins 5B are positioned. The power cable 7 has a plug 8 in the form of a female connector for mating with the male connector of the socket 5. The plug 8 comprises a body portion 8A having holes 8B for receiving the pins 5B of the socket 5. The body portion 8A is received in the receptacle 5C when the two parts mate. This arrangement helps make a secure mechanical connection between the two parts as well as shielding the pins 5B. Such an arrangement is common for example in the United States of America.

In FIG. 5, the device has the cable 7 fixedly attached to the housing, i.e. there is no plug and socket arrangement to allow the cable to be connected/disconnected from the device by the operator. Such an arrangement is common for example in the United Kingdom.

It should be noted that in this document the convention is followed of referring to the connector on the electrical device as the "socket" and the connector on the power cable which moves to connect with the device as the "plug". Also, the connector with protruding pins is known as the "male" connector and the connector with holes for receiving those pins is known as the "female" connector. Thus, the convention which is sometimes seen of always referring to the connector with the protruding pins as the plug is not necessarily followed herein. The terminology of plug/socket and male/female connector used herein is intended to be a convenient way of referring to the connector parts of the power cable/device and is not intended to be limiting unless specifically stated.

The proliferation of different arrangements for making a power connection to a device 1 creates a problem for manufacturers of such devices 1 in that to sell the device in different countries often requires redesigning the part of the device that deals with the power connection. In particular, the housing 6 of the device 1 is commonly manufactured from moulded thermoplastic or suchlike and is arranged according to the particular power connection that is required for that device 1. Thus, the manufacturer must have different tooling for manufacturing the housing of the tool for different countries. This is expensive and inconvenient for manufacturers.

According to a first aspect of the present invention, there is provided an electrical device, the device comprising: a housing; electrical circuitry in the housing, wherein the walls of the housing define a cavity having a first end that is open to the exterior of the device and a second end that is inside the housing, the housing having a first fixing arrangement at the first end of the cavity and a second fixing arrangement at the second end of the cavity, wherein the first and second fixing arrangements are each capable of fixing a power connection insert in position; and, a power connection insert fixed by either the first or second fixing arrangement, wherein the power connection insert and that fixing arrangement are constructed and arranged to mechanically interlock with each other, wherein the power connection insert provides a power cable or power connector, said power cable or power connector being electrically connected to said electrical circuitry such that external electrical power can be supplied to the device via the power cable or power connector.

By appropriate design of the insert and appropriate positioning of the insert in either the first or second fixing arrangement of the housing, the invention allows a wide range of connector types to be provided using a single design of housing. Having two fixing arrangements with different positions allows connectors to be formed using appropriate inserts that can protrude beyond the housing and that can use the cavity to provide shielding for the connection formed when a plug is plugged into that connector. Alternatively a power cable insert can be used where it is not desired to provide a connector at the device. This allows the device to be provided with an appropriate power connection type for most if not all territories in which the device may be sold. This allows manufacturers to keep down costs of manufacturing by having a single design of housing for their product, which reduces tooling costs, and which is also simple to assemble. The design can also be extended to provide different connector types if new connector types are developed in the future by designing appropriate new inserts. The invention is therefore also relatively future proof.

Preferably at least one fixing arrangement is such that there is no straight line path between the insert and the interior of the housing. This helps prevent dust, debris, etc from penetrating the housing. Potentially water can be prevented from penetrating by watertight fit between the housing and insert or by adding seals.

Preferably at least one fixing arrangement is a slot defined by the walls of the housing extending around part or all of the periphery of the cavity. Preferably the insert has a flange which fits into the slot to fix the insert in place. Preferably both fixing arrangements are defined by slots defined by the walls of the housing extending around the periphery of the cavity. These provide a secure way of fixing the insert into position which is simple to manufacture and assemble.

Preferably the first slot has a wider width that the second slot. Generally, the first slot should be wider than the cavity, so that the cavity is accessible, whereas the second slot may be smaller than the width of the cavity, which allows a smaller insert to be used to fit into the second slot.

Preferably the cavity is open or has a hole at its second end through which electrical connection is made between the insert and the electrical circuitry. Generally the electrical circuitry to which a power connection needs to be made will be accommodated within a compartment in the housing. Having an open ended cavity or a hole in the cavity allows electrical wires to be passed from the insert to the electrical circuitry.

Preferably the shape of the cavity is adapted to receive and mate with the body of a standard format connector plug. This can help retain the plug in a socket formed in the device by the appropriate insert.

In an embodiment, the insert is fixed to the second fixing arrangement, the insert having connector pins which extend into the cavity to form a connector. Thus, a socket is formed in the device by the cavity and insert to which a connector plug can be inserted to make electrical connection to the device. This arrangement can be used to provide for example a connector suitable for use in the United States of America, e.g. the connector known as NEMA 1-15 (North American 15 A/125 V ungrounded).

In an embodiment, the insert is fixed to the first fixing arrangement, the insert having a body portion that extends beyond the housing, the insert having connector pins which extend beyond the body portion to form a connector. This arrangement can be used for example to provide a connector suitable for various European countries, e.g. the connector known as the CEE 7/16 (Europlug 2.5 A/250 V ungrounded).

Preferably, the shape of the body portion of the insert is adapted to be received and mate with a shell of a standard format connector plug. This forms a connector in the device having an extending portion which can mate with part of a connector plug to keep the plug in place.

In an embodiment, the insert is fixed to the first fixing arrangement, the insert having a body with a power cable fixed thereto, the power cable extending through the body into the housing and being connected to the electrical circuitry. This can provide a means of providing power to the device without using a connector at the device suitable for use for example in the United Kingdom.

Preferably, the housing is formed in two parts which attach together to form the cavity. The housing may be formed in two halves which come together along their central plane to form the housing and to form the cavity. Thus, insert can be sandwiched between the parts of the housing as they are attached together, allowing a convenient method of manufacturing the device.

BRIEF DESCRIPTION OF THE DRAWINGS

Embodiments of the present invention will now be described by way of example with reference to the accompanying drawings, in which.

DETAILED DESCRIPTION OF THE INVENTION

Figures 6A, 6B, 6C, 6D:
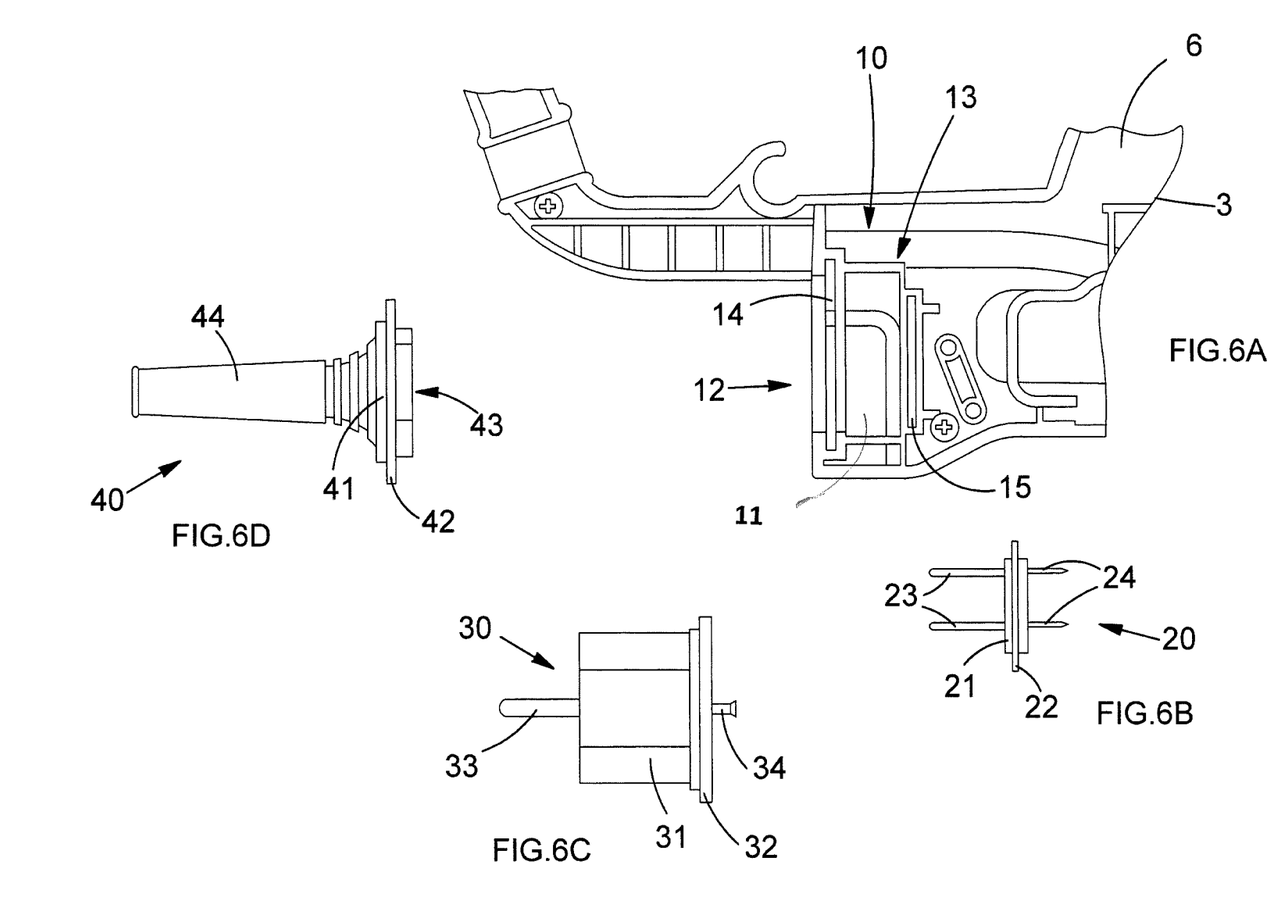
FIG. 6A shows a sectional view of an example of a housing for an electrical device according to an embodiment of the present invention.
FIGS. 6B to 6D show examples of power connection inserts for use with the housing of FIG. 6A.

FIG. 6A shows in cross section a housing 6 for part of an electrical device 1. The electrical device 1 may be any sort where electrical power is provided to the device 1 by a power cable, such as, but not limited to, power tools and garden equipment such as lawnmowers, trimmers, etc. In the present example, the housing 6 forms part of a handle 3 for a device 1, such as the handle of a string trimmer as shown in FIGS. 1 and 2.

The housing 6 has walls that define a cavity 11 in the housing 6. The cavity 11 is generally tubular in shape and in this example is generally cylindrical, having a first end 12 which is open to the outside of the device 1 so the cavity 11 is externally accessible, and a second end 13 which is inside of the housing 6 adjacent to another compartment of the housing 6. Preferably there is a hole in the housing 6 at the second end 13 of the cavity 11 to allow wires to pass from the cavity to the interior of the housing 6 for connection to the power circuitry of the device 1.

FIGS. 6B to 6D show examples of power connection inserts 20, 30, and 40. As described in more detail in the following description, any of these may be received and held in position in the cavity 11. According to the type of insert, the insert may be positioned either at the first end of the cavity or the second end of the cavity as will be described.

The housing 6 has fixing arrangements to fix the inserts in position in the cavity 11 by enabling a mechanical interlock to be made between the inserts and the housing 6. In the example of FIGS. 6A, the fixing arrangements are provided by a first circumferential slot 14 defined by the walls of the housing 6 adjacent the first end of the cavity 11, and a second circumferential slot 15 is defined by the walls of the housing 6 adjacent the second end 13 of the cavity 11. The first circumference slot 14 has a larger diameter than the second slot 15. The inserts 20, 30, and 40 shown in FIGS. 6B, 6C and 6D each have a body 21, 31 and 41 with a protruding circumferential flange 22, 32 and 42 which is received in one of the slots 14, 15 of the cavity 11, thereby forming a mechanical interlock between the insert and the housing 6, in order to hold the insert in position.

The housing 6 is preferably formed in at least two parts to aid assembly of the device 1. In the preferred example, the housing is in two halves (one half being shown in FIG. 6A) which are fixed together by fasteners so that the housing 6 forms the cavity 11 and fits about the insert (shown most clearly in FIGS. 10 to 12).

Figure 7:
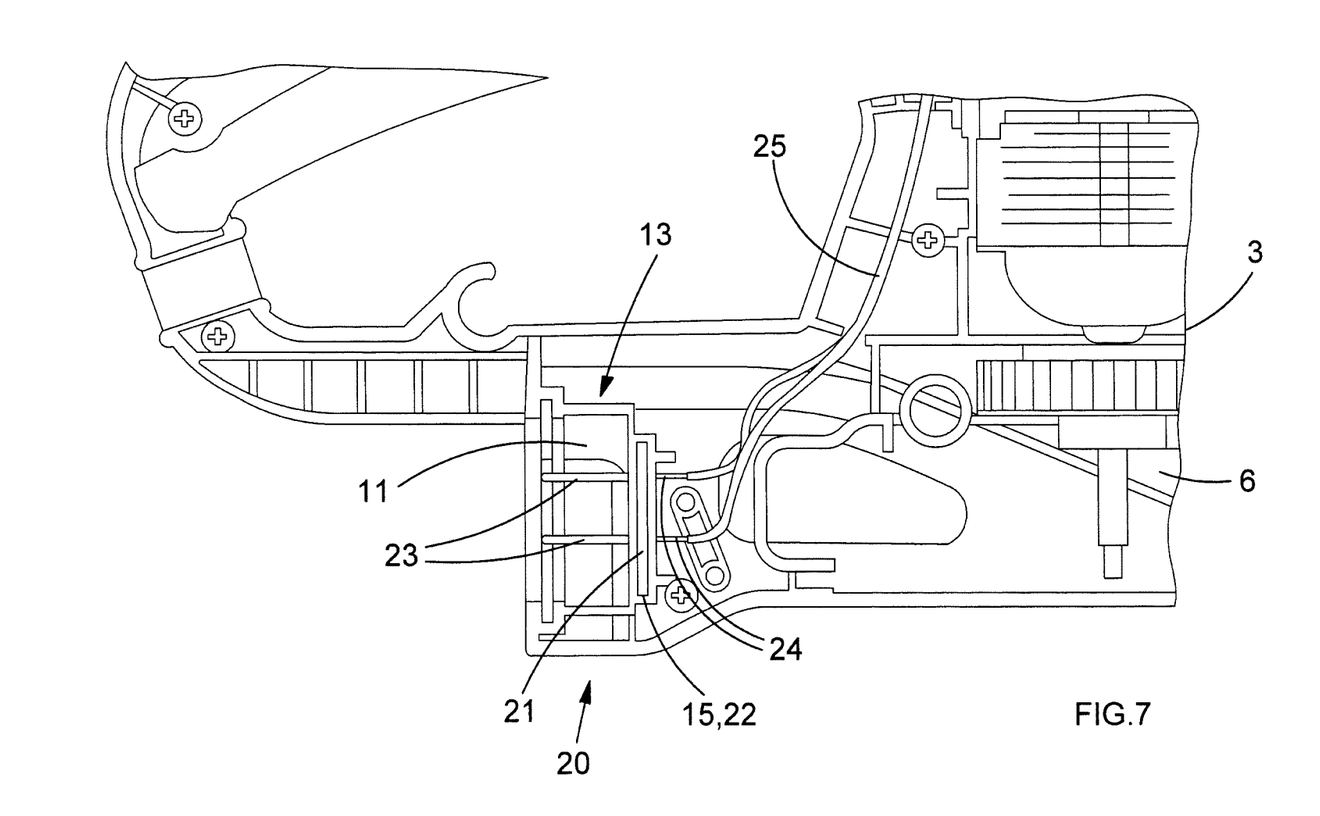
FIG. 7 shows in cross section the insert of FIG. 6B installed with the housing of FIG. 6A.
Figure 10:
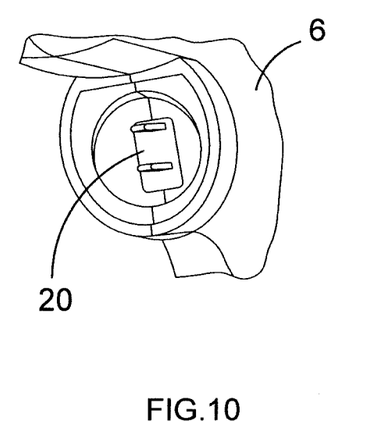
FIGS. 10 to 12 show detailed views of the arrangements of FIGS. 7 to 9 respectively.

FIG. 6B shows an insert 20 for providing a connector of the type which is suitable for use for example in the USA. The body 21 of the insert 20 has two conductor pins 23 extending from it. The body 21 has a circular flange 22 projecting radially outwards which fits into the second slot 15 in the housing 6. FIGS. 7 and 10 show the insert 20 received within the cavity 11. As can be seen from FIG. 7, the rear portions of the pins 24 are connected by wires 25 to the power circuitry of the device 1. Thus, the cavity 11 and the projecting pins 23 form a socket which can receive a plug 8 of the type shown in FIG. 4 to enable electrical connection to be made to the device 1. The connector thus formed can be a NEMA 1-15 (North American 15 N125 V ungrounded) type in which the pins 23 have the form of two flat parallel non-coplanar blades. The inside surface of the cavity 11 preferably has a shape which closely receives the body of the plug 8 to avoid the plug working loose when the device 1 is in operation.

Figure 8:
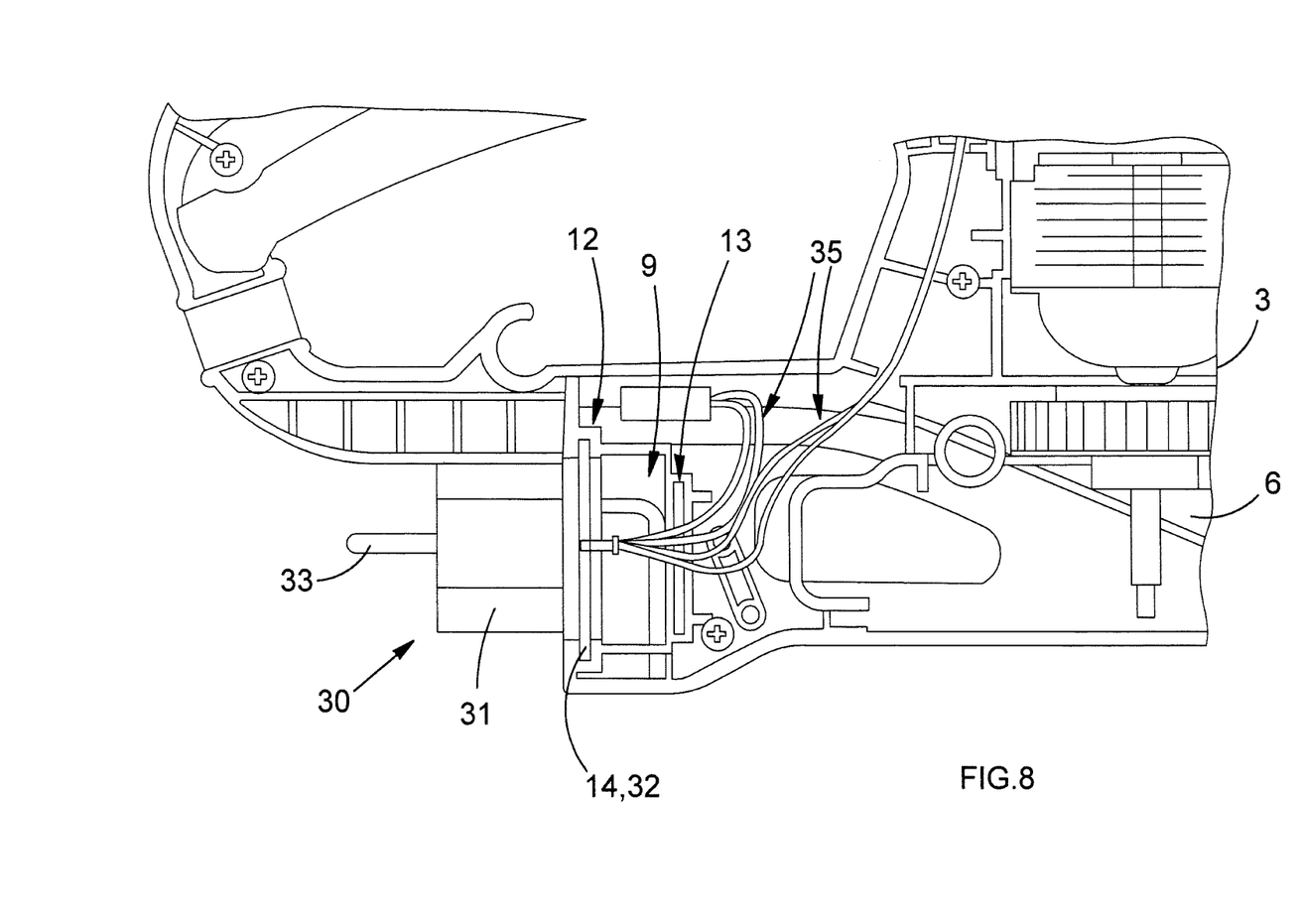
FIG. 8 shows in cross section the insert of FIG. 6C installed with the housing of FIG. 6A.
Figure 11:
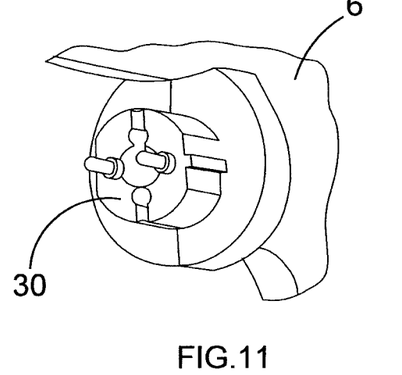

FIG. 6C shows an insert 30 for providing a connector of the type which is suitable for use for example in various European countries known as the CEE 7/16 (Europlug 2.5 A/250 V ungrounded). The body 31 has two conductor pins 33 extending therethrough. The body 31 is generally cylindrical and has a circular flange 32 projecting radially outwards from its rear end which fits into the first slot 14 in the housing 6. FIGS. 8 and 11 show the insert 30 received within the housing 6. As can be seen, when so positioned, the cylindrical portion of the body 31 of the insert 30 extends outwards from the housing 6 of the device 1. As can be seen from FIG. 8, the rear portions 34 of the pins 33 are connected by wires 35 to the power circuitry of the device 1 inside the housing 6. Thus, body 31 and the projecting pins 33 form a socket which can mate with a plug 8 of the type shown in FIG. 5 to enable electrical connection to be made to the device 1. The body 31 of the insert preferably has a shape which closely fits the shell part of the plug 8 to avoid the plug working loose when the device 1 is in use.

Figure 9:
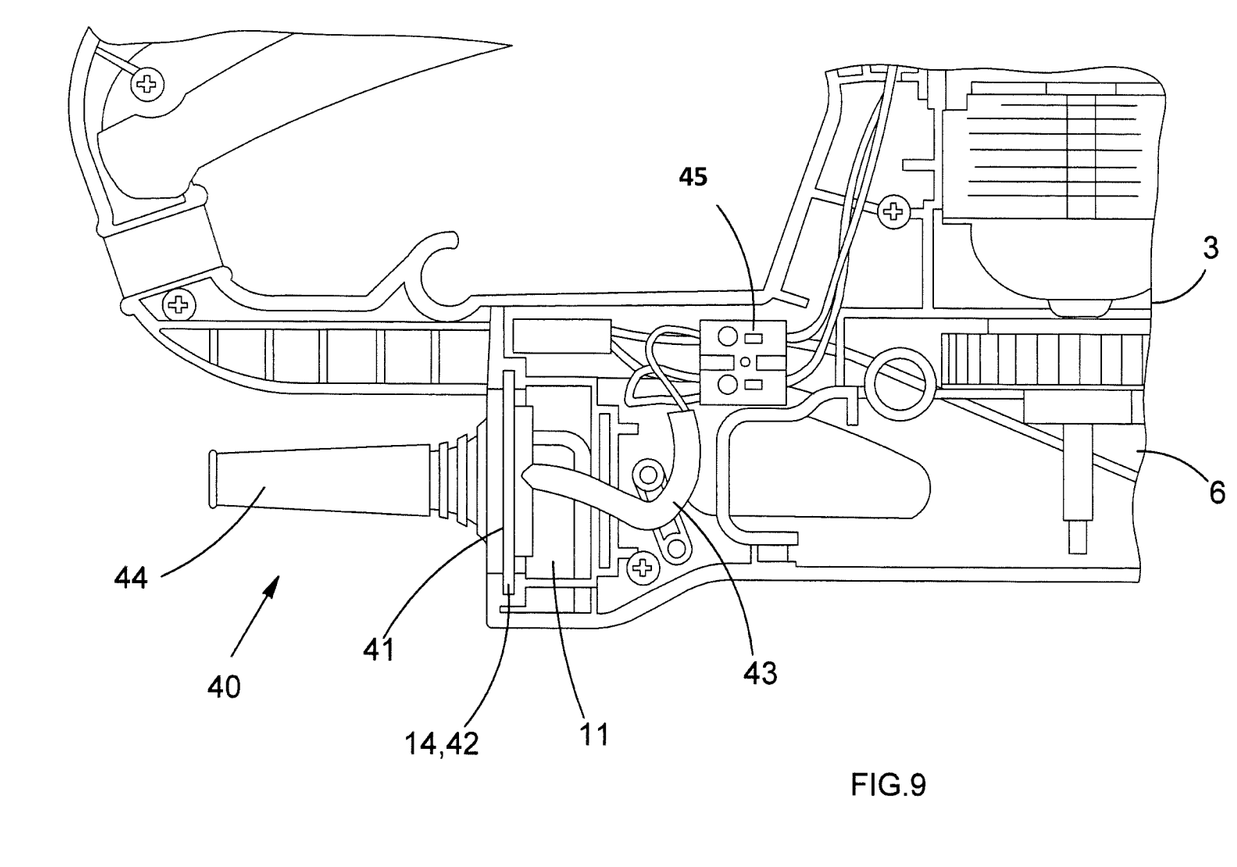
FIG. 9 shows in cross section the insert of FIG. 6D installed with the housing of FIG. 6A.
Figure 12:
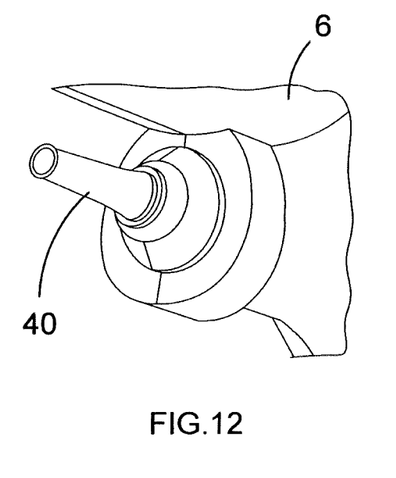

FIG. 6D shows an insert 40 suitable for use in for example the United Kingdom. This insert 40 comprises a body portion 41 having a circular flange 42 projecting radially outwards from its rear end which fits into the first slot 14 in the housing 6. The body 41 has a power cable 43 passing therethrough and may optionally have a strain relief grommet 44 attached to its outer face to support and protect the power cable 43. FIGS. 9 and 12 show the insert 40 received within the housing 6. As can be seen from FIG. 9, once it passed through the body of the insert 40, the cable 43 connects to the power circuitry of the device 1 inside the housing 6. The wires of the cable 44 may be connected by a screw junction box 45 to enable easy connection and/or replacement of the cable 44 in case of damage. Thus, the insert 40 provides a power cable to enable electrical connection to be made to the device 1.

Thus, the manufacturer of the electrical device can manufacture a housing 6 to a single design and by using the appropriate inserts 30,40,50, can provide a wide range of different power couplings to adapt the device to different requirements or the different standards of different countries.

As the skilled person will appreciate, the present invention is not limited to the particular examples of connector show and described herein. Other connector types can be provided using the schemes outlined herein. For example, the inserts could be adapted to be grounded to the housing where the housing is made of a metal, and/or to have earth wire.

Different fixing arrangements could be used to fix the inserts 20, 30 and 40 to the housing 6. For example, the housing 6 could have projections and the insert 20, 30 and 40 could have corresponding holes in its body to receive the projections, or visa versa. The projections can extend all the way around the circumference of the insert 20, 30 and 40 or be at discrete intervals. The insert 20, 30 and 40 and the walls of the housing 6 defining the cavity 11 can be keyed to prevent misinsertion or misalignment of the insert 20, 30 and 40 in the cavity 11. The walls of the housing defining the cavity 11 could be keyed to the plug 8 to prevent the plug 8 being misinserted or to aid alignment when plugging in the plug 8.

It is preferred however that the interlock between the housing 6 and insert 20, 30 and 40 is such that there is no straight line path into the housing between the housing and the insert to help prevent debris and/or moisture entering the housing 6.

Embodiments of the present invention have been described with particular reference to the example illustrated. However, it will be appreciated that variations and modifications may be made to the examples described within the scope of the present invention.

The invention claimed is:

1. An electrical device, the device comprising:
a housing;
electrical circuitry positioned in the housing,
wherein the housing having walls that define a cavity with a first end that is open to the exterior of the device and a second end that is inside the housing, the housing having a first fixing arrangement at the first end of the cavity and a second fixing arrangement at the second end of the cavity; and
power connection inserts, wherein one of the power connection inserts secure a terminal end of a power cable or power connector to either the first fixing arrangement or second fixing arrangement, wherein the one of the power connection inserts and the first fixing arrangement or second fixing arrangement are constructed and arranged to mechanically interlock with each other, said power cable or power connector being electrically connected to said electrical circuitry such that external electrical power can be supplied to the device via the power cable or power connector.

2. A device according to claim 1, wherein at least one of the first or second fixing arrangement is such that there is no straight line path between the insert and the interior of the housing.

3. A device according to claim 2, wherein at least one of the first or second fixing arrangement is a slot defined by the walls of the housing extending around part or all of the periphery of the cavity.

4. A device according to claim 3, wherein the insert has a flange which fits into the slot to fix the insert in place.

5. A device according to claim 1, wherein the cavity is open or has a hole at its second end through which electrical connection is made between the insert and the electrical circuitry.

6. A device according to claim 1, wherein the insert is fixed to the second fixing arrangement, the insert having connector pins which extend into the cavity to form a connector.

7. A device according to claim 1, wherein the insert is fixed to the first fixing arrangement, the insert having a body portion that extends beyond the housing, the insert having connector pins which extend beyond the body portion to form a connector.

8. A device according to claim 1, wherein the insert is fixed to the first fixing arrangement, the insert having a body with a power cable fixed thereto, the power cable extending through the body into the housing and being connected to the electrical circuitry.

9. A device according to claim 1, wherein the housing is formed in two parts which attach together to form the cavity.

10. An electrical device, the device comprising:
a housing;
electrical circuitry in the housing,
wherein the housing having walls that define a cavity with a first end that is open to the exterior of the device and a second end that is inside the housing, the housing having a first fixing arrangement at the first end of the cavity and a second fixing arrangement at the second end of the cavity;

a power connection insert secured by either the first or second fixing arrangement, wherein the power connection insert and that fixing arrangement are constructed and arranged to mechanically interlock with each other, wherein the power connection insert provides a power cable or power connector, said power cable or power connector being electrically connected to said electrical circuitry such that external electrical power can be supplied to the device via the power cable or power connector;

wherein at least one of the first or second fixing arrangement is such that there is no straight line path between the insert and the interior of the housing;

wherein at least one of the first or second fixing arrangement is a slot defined by the walls of the housing extending around part or all of the periphery of the cavity;

wherein the insert has a flange which fits into the slot to fix the insert in place; and wherein both fixing arrangements are defined by slots defined by the walls of the housing extending around the periphery of the cavity.

11. A device according to claim 10, wherein the first slot has a wider width than the second slot.

* * * * *